United States Patent Office 3,664,810
Patented May 23, 1972

3,664,810
PROCESS FOR OZONIZING UNSATURATED COMPOUNDS TO FORM ALKALI EARTH METAL PEROXIDE, ALIPHATIC ALDEHYDES AND ALIPHATIC KETONES
Anatoly Tikhonovich Menyailo, Scherbakovskaya 35, kv. 101; Mikhail Valerievich Pospelov, Komsomolsky prospekt 26, kv. 38; and Olga Romanovna Kaliko, Ulitsa Pivchenko 5, kv. 33, all of Moscow, U.S.S.R.; Inna Evgenievna Pokrovskaya, Moskovskaya obl., Vakzalnayaul. 7, kv. 37, Kaliningrad, U.S.S.R.; Valentine Vsevolodovna Fedorova, Ulitsa Rybalko 16, korp. 1, kv. 59; Albina Georgievna Shilnikova, Mytnaya ul. 23, korp 3, kv. 163; and Antonina Karpovna Yakovleva, Ul. Akademika Pavlova 56, kv. 81, all of Moscow, U.S.S.R.; and Tamara Georgievna Narozhenko, Moskovskaya obl., ul. Belinskogo 8, Kaliningrad, U.S.S.R.
No Drawing. Filed Sept. 3, 1968, Ser. No. 757,124
Int. Cl. C01b *15/04;* C07c *47/00, 49/00*
U.S. Cl. 23—187                            7 Claims

ABSTRACT OF THE DISCLOSURE

Unsaturated hydrocarbons such as normal olefines, isoölefines, aralkylenes and cyclic olefines are converted to the corresponding carbonyl compounds, i.e., aldehydes or ketones, by reaction with ozone and an alkaline earth metal hydroxide in an aqueous or aqueous-organic medium, accompanied by the simultaneous formation of the alkaline earth peroxide.

---

This invention relates to a process for ozonizing unsaturated compounds with the simultaneous production of carbonyl compounds and inorganic peroxides.

Carbonyl compounds, e.g. aldehydes and ketones, find extensive application in the production of higher aliphatic alcohols, plastics, plasticizers, etc.

Now it is known to ozonize unsaturated compounds, e.g. cyclohexene, in an organic solvent (ethyl alcohol) with the production of organic peroxides (alkoxy hydroperoxides, cyclic peroxides, etc.). To obtain carbonyl compounds said peroxides are subjected to special treatment, e.g. hydrogenation, considerable difficulty being involved in isolating carbonyl compounds from the reaction mixture.

Thus, the above ozonizing process does not permit of obtaining carbonyl compounds in one stage. Moreover, extensive application of said process for the production of carbonyl compounds (aldehydes and ketones) is hampered by the explosiveness of the reaction products, the absence of efficient methods of isolating the individual reaction products and the inadequate utilization of the active oxygen.

The primary object of the present invention is to provide a safe process for ozonizing unsaturated compounds.

Another object of the invention is to provide a process for producing carbonyl compounds in one stage.

The foregoing objects have been accomplished by the provision of a process wherein, according to the invention, unsaturated compounds, e.g. normal olefines, isoölefines, aralkylenes, or cyclic olefines, are reacted with ozone and the hydroxide of an alkaline earth metal, viz magnesium, calcium, strontium or barium. The reaction is carried out in an aqueous or aqueous-organic medium. The reaction is preferably carried out at 0–30° C. and under atmospheric pressure. The aqueous-organic medium can be water-acetone or water-heptane. The process can be carried out batchwise or continuously.

In some cases ozonizing is carried out in the presence of an emulsifier, sodium stearate, to provide better contact of the reagents.

The yield of carbonyl compounds depends on the alkaline earth metal hydroxide employed, the relative activity of the hydroxides in the given process being as follows:

$$Mg(OH)_2 < Ca(OH)_2 < Sr(OH)_2 < Ba(OH)_2$$

Reactions of unsaturated compounds with ozone and the hydroxide of an alkaline earth metal can be indicated as follows:

I
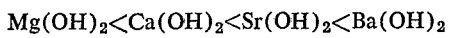
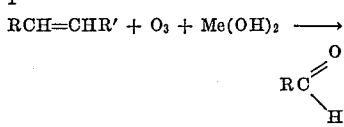

II
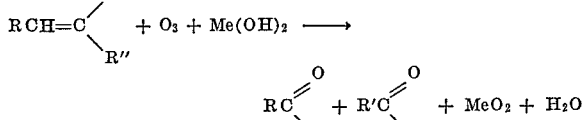

III
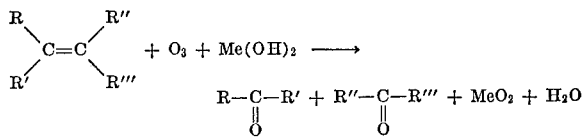

IV
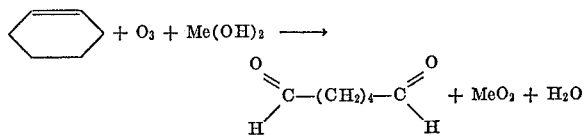

V
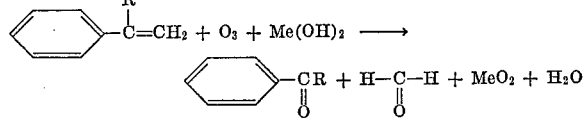

In the above formulas R, R', R" and R'" are normal alkyls containing 1–18 carbon atoms, and Me is in alkaline earth metal.

It should be noted that when the peroxides of alkaline earth metals thus produced are decomposed by conventional methods, e.g.. with dilute sulfuric acid, hydrogen peroxide is obtained quite simply and in theoretical yield.

Thus, the present invention provides a safe process. The principal advantage of the invention is the possibility it presents of simultaneously obtaining carbonyl compounds and peroxides of alkaline earth metals. The reaction mixtures are easily separated into their individual components as is disclosed in the examples given hereinbelow.

EXAMPLE 1

Into a four-necked flask fitted with a stirrer and two bubblers are placed 100 ml. of acetone, 8.5 g. of barium hydroxide and 15 ml. of water, after which, with vigorous stirring and at a temperature of 20° C., there is fed through one bubbler ethylene and through the other, nitrogen containing 5% of ozone, at rates to give a 1:1 molar ratio of ethylene to ozone.

After 1.4 g. of ethylene and 2.4 g. of ozone have been passed through the reactor the reaction is stopped and the precipitate of barium peroxide is quickly filtered off from the aqueous-acetone solution which contains formaldehyde. Formaldehyde is recovered from the aqueous-acetone solution by fractional distillation. There are obtained 7.65 g. of 36% aqueous formaldehyde solution, corresponding to 2.85 g. of $CH_2O$, a yield of 92% of theory, as well as 7.3 g. of barium peroxide or 87% of theory.

EXAMPLE 2

Into a column-type reactor there is continuously fed from below upwards a suspension of barium hydroxide in an aqueous-acetone solution, the ratio of $Ba(OH)_2$ to water to acetone being 1:2:10 by weight, as well as ozone diluted with nitrogen to give an $O_3$ content of about 5% by volume, and gas containing 15% of propylene, 18% of 1-butene, 20.5% of 2-butene, 17% of propane, 24.5% of butane (by volume) and small amounts of methane, ethane and ethylene. The suspension leaving the reactor is filtered, thus giving a filtrate containing acetone, water, formaldehyde, acetaldehyde and propionaldehyde. From the passage of 45 l. of gas of the specified composition there are obtained 17.5 g. of formaldehyde (86.5% of theory), 38.0 g. of acetaldehyde (62.5% of theory) and 19.2 g. of propionaldehyde (91.2% of theory), as well as 156 g. of $BaO_2$ (84.5% of theory).

EXAMPLE 3

15.0 g. of 1-nonene, 100 ml. of water and 20.0 g. of calcium hydroxide are stirred with sodium stearate as emulsifier until a homogeneous suspension is formed. Through this suspension there is passed a stream of nitrogen containing 5% of ozone until all the olefine has reacted, 5.7 g. of ozones being absorbed. The reaction mixture is filtered and the filtrate separated into two layers. The two layers are fractionated separately. There are obtained 14.1 g. of capryl aldehyde (93.0% of theory) and 9.7 g. of 37% formaldehyde solution (94.5% of theory) as well as 6.7 g. of calcium peroxide. The capryl aldehyde obtained is 98% pure; B.P. 60° C. at 9 mm. Hg.

EXAMPLE 4

6.5 g. of 2-heptene is oxonized as in Example 3 (3.3 g. of ozone absorbed) in a mixture of 15 ml. of water and 85 ml. of acetone in the presence of 9.0 g. of strontium hydroxide. The reaction products are filtered from the strontium peroxide formed, thus giving 5.5 g. of n-valeraldehyde (96.5% of theory) and 2.65 g. of acetaldehyde (90% of theory), as well as 7.9 g. of strontium peroxide (89% of theory). The valeraldehyde obtained is 97% pure, B.P. 102° C.; the acetaldehyde is 98% pure, B.P. 20° C.

EXAMPLE 5

To 30.0 g. of 1-tetradecene are added 0.1 l. of water and 0.8 l. of acetone. To the homogeneous mixture formed are added 80 g. of barium hydroxide, and a stream of gas containing about 3% of ozone is passed through the reaction mixture with vigorous stirring until the olefine completely disappears. (7.4 g. of ozone are absorbed.) The precipitate is then filtered out of the reaction mixture and the filtrate separated into its components by fractional distillation and extraction. There are obtained 29.5 g. of tridecanal (98% of theory) and 11.7 g. of 37% formaldehyde solution (93.5% of theory), as well as 25 g. of barium peroxide (88% of theory). The tridecanal is 96.5% pure M.P. 28° C., B.P. 158° C. (10 mm.).

EXAMPLE 6

4.2 g. of a high-boiling fraction of higher olefines containing according to analysis 95% α-olefines, the number of carbon atoms being of the order of 20–24, are ozonized in 50 g. of n-heptane and 10 ml. of water in the presence of 2.0 g. of strontium hydroxide and a small amount of sodium stearate as emulsifier (1 g. of ozone is absorbed). After removal of the precipitate the higher aldehydes dissolved in the heptane are separated from the aqueous solution of formaldehyde which contains a small amount of acetaldehyde. After distilling off the heptane 3.4 g. of a mixture of higher aldehydes are obtained (80% yield on the basis of the initial material). The mixture of higher aldehydes is converted into the 2,4-dinitrophenylhydrazones and chromatographed on paper. According to chromatographic analysis the mixture consists of higher aldehydes from $C_{19}$ to $C_{23}$. The carbonyl number determined by oxime formation with hydroxylamine is 182. 1.05 g. of strontium peroxide and 0.25 g. of formaldehyde are also obtained, as well as a very small amount of acetaldehyde.

EXAMPLE 7

Into a four-necked flask fitted with a stirrer, reflux condenser and bubbler are placed 10.6 g. of 2-methyl-1-pentene, 72.6 g. of acetone, 10.8 g. of calcium hydroxide and 2.0 ml. of water. Ozone diluted with nitrogen to an ozone content of about 5% by volume is then passed through the bubbler at room temperature with vigorous stirring as long as ozone is absorbed (6 g.).

The reaction is then stopped and the precipitate of calcium peroxide is quickly filtered out of the acqueous-acetone solution of methyl propyl ketone. The filtrate is fractionated to give 10.3 g. of methyl propyl ketone (95% of theory) and 3.5 g. of formaldehyde (91.5% of theory). 7.45 g. of calcium peroxide are also obtained (82% of theory).

EXAMPLE 8

A reaction mixture consisting of 20 g. of cyclohexene, 50 g. of water, 200 ml. of acetone and 32 g. of barium hydroxide is ozonized at 0° C. The precipitate of barium peroxide is then filtered out. The solvent is distilled off from the filtrate and the residue consisting chiefly of adipaldehyde is distilled in vacuo.

The adipaldehyde obtained boils at 55° (1 mm.).

There are obtained 26.1 g. of adipaldehyde (95% of theory), and 0.79 g. of adipaldehydic acid (2.5% of theory), as well as barium peroxide (88% of theory).

EXAMPLE 9

A reaction mixture consisting of 5 g. of m-divinylbenzene, 20 g. of water, 100 ml. of acetone and 5 g. of barium hydroxide is ozonized at room temperature. The precipitate of barium peroxide is then filtered out and the solvent and formaldehyde distilled off from the filtrate. The residue is isophthalaldehyde which after a single crystallization from aqueous ethanol forms an oxime with hydroxylamine, M.P. 180° C.

The yield of isophthalaldehyde is 4.6 g. or 90% of theory, formaldehyde 1.06 g. or 92% of theory and barium peroxide 87% of theory.

What is claimed is:

1. A process for ozonizing an unsaturated hydrocarbon selected from the group consisting of normal olefines, isoölefines and cyclic olefines with the simultaneous production of an inorganic peroxide and the aliphatic aldehydes and ketones which result from cleavage of the double bond of the olefin and the formation of carbonyl groups at each of the two carbon atoms initially bonded by the double bond which comprises reacting the unsaturated hydrocarbon with ozone and an alkaline earth metal hydroxide selected from the group consisting of magnesium hydroxide, barium hydroxide, strontium hydroxide and calcium hydroxide, in a medium selected from the group consisting of an aqueous medium and an aqueous-organic medium.

2. A process as claimed in claim 1, wherein the aqueous-organic medium is an aqueous-acetone medium.

3. A process as claimed in claim 1, wherein the aqueous-organic medium is an aqueous-heptane medium.

4. A process as claimed in claim 1, wherein ozonizing is carried out at a temperature of 0–30° C. under atmospheric pressure.

5. A process as claimed in claim 1 which further comprises carrying out the reaction in the presence of sodium stearate as an emulsifier.

6. A process as claimed in claim 5, wherein the aqueous-organic medium is an aqueous-heptane medium.

7. A process as claimed in claim 5, wherein ozonizing is carried out at 0–30° C. under atmospheric pressure.

References Cited

UNITED STATES PATENTS

| | | | |
|---|---|---|---|
| 560,494 | 5/1896 | Haarman | 260—600 |
| 1,843,862 | 2/1932 | Buc | 23—1 B UX |
| 2,215,856 | 9/1940 | Pfleiderer | 23—187 XR |
| 3,033,903 | 5/1962 | Loeb | 260—621 G |

OTHER REFERENCES

American Chemical Society, "Ozone Chemistry And Technology," 1959, pp. 184–194.

May: "The Perfumery And Essential Oil Record," vol. 15, pp. 351–353 (October 1924).

Righter; "Textbook Of Organic Chemistry," 2nd ed., 1943, pp. 470–471.

MILTON WEISSMAN, Primary Examiner

U.S. Cl. X.R.

260—597, 604